(12) United States Patent
Kuki et al.

(10) Patent No.: US 9,752,637 B2
(45) Date of Patent: Sep. 5, 2017

(54) VIBRATION DAMPING BUSHING AND MANUFACTURING METHOD OF VIBRATION DAMPING BUSHING

(71) Applicant: SUMITOMO RIKO COMPANY LIMITED, Komaki-shi, Aichi (JP)

(72) Inventors: Norimasa Kuki, Komaki (JP); Takashi Kume, Kasugai (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/712,356

(22) Filed: May 14, 2015

(65) Prior Publication Data

US 2015/0247543 A1 Sep. 3, 2015

Related U.S. Application Data

(63) Continuation of application No. PCT/JP2014/064643, filed on Jun. 2, 2014.

(30) Foreign Application Priority Data

Jun. 27, 2013 (JP) ................................. 2013-134547

(51) Int. Cl.
*F16F 1/38* (2006.01)
*F16F 1/393* (2006.01)

(52) U.S. Cl.
CPC ............ *F16F 1/3842* (2013.01); *F16F 1/393* (2013.01); *F16F 2226/04* (2013.01)

(58) Field of Classification Search
CPC .. F16F 1/38; F16F 1/3863; F16F 1/387; F16F 1/3876; F16F 1/54; F16F 2236/123;
(Continued)

(56) References Cited

U.S. PATENT DOCUMENTS 3,030,132 A * 4/1962 Compton ............ F16C 11/0614
403/203
3,140,081 A * 7/1964 Peterson ................. F16F 1/387
267/153

(Continued)

FOREIGN PATENT DOCUMENTS

FR 2874670 A1 3/2006
JP H03-012029 U1 2/1991
(Continued)

OTHER PUBLICATIONS

Dec. 29, 2015 International Preliminary Report on Patentability issued in International Patent Application No. PCT/JP2014/064643.
(Continued)

*Primary Examiner* — Robert A Siconolfi
*Assistant Examiner* — San Aung
(74) *Attorney, Agent, or Firm* — Oliff PLC

(57) ABSTRACT

A manufacturing method of a vibration damping bushing wherein an outer cylindrical member arranged on an outer peripheral side of an inner axial member is provided with on its both axial sides a pair of first inclined cylindrical parts each having a diameter gradually reduced toward an axial outside and a pair of second inclined cylindrical parts each extending further toward the axial outside from an axial end of the corresponding first inclined cylindrical part with an inclination angle smaller than that of the first inclined cylindrical part. The outer cylindrical member is arranged on the outer peripheral side of the inner axial member to be connected thereto by a main rubber elastic body. Axial ends of the main rubber elastic body are deformed by increasing the inclination angle of the second inclined cylindrical parts of the outer cylindrical member through a drawing operation.

10 Claims, 4 Drawing Sheets

(58) Field of Classification Search
CPC ...... F16F 2228/08; F16F 1/393; F16F 1/3814; F16F 1/3873; F16F 1/3935; B21J 9/025; B21K 21/12; B60G 3/20; B60G 7/005; B60G 21/0551; B60G 2200/18; B60G 2200/21; B60G 2204/14; B60G 2204/41; B60G 2204/1434; B60G 2204/41042
USPC ................... 267/141.2, 141.1, 141, 282, 292; 188/1.11 E; 29/888.06, 888.061
See application file for complete search history.

(56) References Cited

U.S. PATENT DOCUMENTS

| | | | | |
|---|---|---|---|---|
| 5,887,859 | A * | 3/1999 | Hadano | F16F 1/3863 267/141.1 |
| 2002/0079629 | A1* | 6/2002 | Tadano | F16F 1/3863 267/140.11 |
| 2003/0020223 | A1* | 1/2003 | Kameda | B21J 9/025 267/293 |
| 2005/0206054 | A1* | 9/2005 | Nishi | F16F 1/3814 267/140.5 |
| 2007/0201945 | A1* | 8/2007 | Scharioth | B60G 7/001 403/132 |
| 2009/0289399 | A1* | 11/2009 | Suzuki | B60G 3/20 267/140.12 |
| 2011/0026862 | A1* | 2/2011 | Bjoerkgard | B60G 7/005 384/125 |
| 2012/0001398 | A1* | 1/2012 | Darcy-Sharma | B60G 7/006 280/124.125 |
| 2014/0091507 | A1* | 4/2014 | Oldfield | B60G 7/001 267/292 |
| 2015/0014906 | A1 | 1/2015 | Shinobu et al. | |

FOREIGN PATENT DOCUMENTS

| | | |
|---|---|---|
| JP | H04-111933 U | 9/1992 |
| JP | H09-100859 A | 4/1997 |
| JP | H09-203428 A | 8/1997 |
| JP | 2003-226239 A | 8/2003 |
| JP | 2004-001023 A | 1/2004 |
| JP | 2011-036912 A | 2/2011 |
| JP | 2012-202460 A | 10/2012 |
| JP | 2013-224729 A | 10/2013 |
| WO | 2013/140700 A1 | 9/2013 |

OTHER PUBLICATIONS

Aug. 5, 2014 International Search Report issued in International Patent Application No. PCT/JP2014/064643.
May 5, 2016 Office Action issued in Chinese Patent Application No. 201480020950.9.
Nov. 18, 2016 Office Action issued in Chinese Application No. 201480020950.9.
Feb. 3, 2017 Office Action issued in Japanese Application No. 2013-134547.

* cited by examiner

VIBRATION DAMPING BUSHING AND MANUFACTURING METHOD OF VIBRATION DAMPING BUSHING

INCORPORATED BY REFERENCE

The disclosure of Japanese Patent Application No. 2013-134547 filed on Jun. 27, 2013 including the specification, drawings and abstract is incorporated herein by reference in its entirety. This is a Continuation of International Application No. PCT/JP2014/064643 filed on Jun. 2, 2014.

BACKGROUND OF THE INVENTION

1. Field of the Invention

The present invention relates to a vibration damping bushing used for an automobile suspension mechanism, for example, and a manufacturing method thereof.

2. Description of the Related Art

Conventionally, in an automobile suspension mechanism, for example, a vibration damping bushing has been used at a connecting portion of a suspension arm member to the vehicular body. Such a vibration damping bushing has a structure where an inner axial member and an outer cylindrical member externally fitted thereto are elastically connected by a main rubber elastic body.

The vibration damping bushing often requires hard spring characteristics in the axis-perpendicular direction for the purpose of improving the driving stability of motor vehicles. Therefore, as described in Japanese Unexamined Utility Model Publication No. JP-U-4-111933, a proposal is made that an intermediate sleeve made of metal or the like be embedded in and fixed to the middle portion of the main rubber elastic body in the radial direction.

Also, from the standpoint of improving the riding comfort of motor vehicles, the inner axial member and the outer cylindrical member are often required to have soft spring characteristics in the prizing direction inclined to each other. Now, as described in Japanese Unexamined Utility Model Publication No. JP-U-3-012029, a proposal is made to set the spring constant large enough in the axis-perpendicular direction while restricting any increase in the spring constant in the prizing direction by means of tapering off both ends of the outer cylindrical member in the axial direction by a drawing operation.

However, in the structure using the intermediate sleeve as described in the former example, it ends up with having hard spring characteristics not only in the axis-perpendicular direction but also in the prizing direction, which poses a problem of hardly being able to avoid deterioration in the riding comfort of motor vehicles.

Also, in the structure where both axial ends of the outer cylindrical member are tapered off as described in the latter example, significant pre-compressive deformation is caused due to the drawing operation of the outer cylindrical member at the axial end faces of the main rubber elastic body where the strain generated by a load input in the prizing direction is maximized. For that reason, during load input in the prizing direction, the strain and stress generated at the axial end faces of the main rubber elastic body get further increased, which tends to cause cracks therein posing a problem of hardly being able to achieve the required durability.

SUMMARY OF THE INVENTION

The present invention has been developed in view of the above-described matters as the background, and it is an object of the present invention to provide a vibration damping bushing with a novel structure which is able to provide spring characteristics that are hard in the axis-perpendicular direction but soft in the prizing direction, while ensuring high durability of the bushing.

A first aspect of the present invention provides a manufacturing method of a vibration damping bushing wherein an outer cylindrical member is arranged on an outer peripheral side of an inner axial member, and the inner axial member and the outer cylindrical member are connected in a radial direction by a main rubber elastic body, the method comprising: providing the outer cylindrical member on its both axial sides with a pair of first inclined cylindrical parts each having a diameter gradually reduced toward an axial outside and a pair of second inclined cylindrical parts each extending further toward the axial outside from an axial end of the corresponding first inclined cylindrical part with an inclination angle smaller than that of the first inclined cylindrical part; arranging the outer cylindrical member on the outer peripheral side of the inner axial member and connecting the outer cylindrical member and the inner axial member via the main rubber elastic body; and then deforming axial ends of the main rubber elastic body by increasing the inclination angle of the second inclined cylindrical parts of the outer cylindrical member through a drawing operation.

According to the manufacturing method of the present aspect, by controlling swelling deformation outward in the axial direction at each axial end of the main rubber elastic body by the first inclined cylindrical part of the outer cylindrical member, deformation of the main rubber elastic body at a load input in the axis-perpendicular direction is restricted, thus enabling to achieve hard spring characteristics. Meanwhile, the first inclined cylindrical part described above is inclined in the displacement direction relative to the inner axial member at a load input in the prizing direction, which can increase the shear component as opposed to the compression component of elastic deformation of the main rubber elastic body, thus enabling to achieve soft spring characteristics.

Thereafter, by means of a drawing operation of the second inclined cylindrical part of the outer cylindrical member after the vulcanization molding of the main rubber elastic body, the pre-compression at each axial end of the main rubber elastic body can be set with finer adjustments. In doing that, by means of a drawing operation of the second inclined cylindrical part after the fixation thereto of the main rubber elastic body by vulcanization molding while ensuring high spring characteristics in the axis-perpendicular direction and low spring characteristics in the prizing direction for the first inclined cylindrical part that had been made inclined before the fixation of the main rubber elastic body by vulcanization molding as described above, further improvements and adjustments of those characteristics can be made in high precision. Therefore, in an attempt to achieve both high spring characteristics in the axis-perpendicular direction and low spring characteristics in the prizing direction, the first inclined cylindrical part that had been made inclined works effectively without any need for a drawing operation to substantially reduce the diameter of the second inclined cylindrical part, which makes it possible to suppress generation of excessive strain and stress at the axial end of the main rubber elastic body caused by the diameter-reducing process of the second inclined cylindrical part after molding of the main rubber elastic body, thus enabling to obtain good durability at the same time.

A second aspect of the present invention provides the manufacturing method of the vibration damping bushing according to the first aspect, wherein the drawing operation includes setting the inclination angle of the second inclined cylindrical parts after the drawing operation at not more than that of the first inclined cylindrical parts after the drawing operation.

According to the manufacturing method of the present aspect, the pre-compression at each axial end of the main rubber elastic body subsequent to the drawing operation of the second inclined cylindrical part can be properly suppressed, while it is made possible to set the free surface of the axial end face of the main rubber elastic body large enough to some extent, thus enabling to ensure the durability of the main rubber elastic body and even of the vibration damping bushing more effectively.

A third aspect of the present invention provides the manufacturing method of the vibration damping bushing according to the first or second aspect, wherein the drawing operation includes increasing the inclination angle of the second inclined cylindrical parts while maintaining the inclination angle of the first inclined cylindrical parts.

According to the manufacturing method of the present aspect, by changing the setting of the inclination angle of the second inclined cylindrical part, while maintaining the relation between the spring characteristics in the axis-perpendicular direction and those in the prizing direction exerted by pre-set inclination angle of the first inclined cylindrical part, it becomes possible to adjust the relation between the spring characteristics in the axis-perpendicular direction and those in the prizing direction in high precision in a predictable manner. However, in the present aspect, it is enough to substantially maintain the inclination angle of the first inclined cylindrical part without proactively changing it so that a slight change in the inclination angle of the first inclined cylindrical part caused by the strain exerted on the first inclination angle subsequent to the setting change of the second inclined cylindrical part, for example, can be allowed to the extent not to adversely affect the spring characteristics.

A fourth aspect of the present invention provides the manufacturing method of the vibration damping bushing according to any one of the first to third aspects, wherein lightening holes are provided so as to open onto both axial end faces of the main rubber elastic body, and an axial bottom face of each lightening hole is located on an inner peripheral side of the corresponding first inclined cylindrical part before the drawing operation of the outer cylindrical member.

According to the manufacturing method of the present aspect, by securing the area of the free surface of the end face of the main rubber elastic body to suppress the maximum strain at the time of load input, it becomes possible to further enhance the durability of the bushing. Also, by locating the deepest portion of the lightening hole in the axial direction on the inner peripheral side of the first inclined cylindrical part before the drawing operation of the outer cylindrical member, it becomes possible to secure enough area of the free surface while avoiding any reduction in the spring constant in the axis-perpendicular direction subsequent to further deepening of the lightening hole.

A fifth aspect of the present invention provides the manufacturing method of the vibration damping bushing according to any one of the first to fourth aspects, wherein lightening holes are provided so as to open onto both axial end faces of the main rubber elastic body, and an axial bottom face of each lightening hole is located on an inner peripheral side of the corresponding second inclined cylindrical part by means of compressive deformation exerted on the main rubber elastic body in an axis-perpendicular direction through the drawing operation to cause swelling deformation to both axial sides thereof.

According to the manufacturing method of the present aspect, as in the fourth aspect described above, it becomes possible to achieve securement of spring characteristics and enhancement of durability in a highly compatible manner by means of locating the deepest portion of the lightening hole in the axial direction on the inner peripheral side of the second inclined cylindrical part after the drawing operation of the outer cylindrical member in addition to further enhancement in the durability of the main rubber elastic body by the lightening hole. In the present aspect, the location of the bottom face of the lightening hole in the axial direction is not limited before the drawing operation of the outer cylindrical member, but such location of the bottom face of the lightening hole in the axial direction that had been on the inner peripheral side of the first inclined cylindrical part before the drawing operation of the outer cylindrical member, for example, can be displaced toward the inner peripheral side of the second inclined cylindrical part as a result of deformation of the main rubber elastic body subsequent to the drawing operation of the outer cylindrical member.

A sixth aspect of the present invention provides the manufacturing method of the vibration damping bushing according to any one of the first to fifth aspects, wherein pre-compression is applied to the main rubber elastic body through a drawing operation of an axial center portion and the first inclined cylindrical parts of the outer cylindrical member to reduce their diameters as well.

By reducing the diameter of the outer cylindrical member after the molding of the main rubber elastic body, it becomes possible to eliminate tensile stress inherent in the main rubber elastic body depending on the molding conditions so as to further enhance the spring characteristics in the axis-perpendicular direction and durability thereof.

A seventh aspect of the present invention provides the manufacturing method of the vibration damping bushing according to any one of the first to sixth aspects, wherein during arranging the outer cylindrical member on the outer peripheral side of the inner axial member and connecting the outer cylindrical member and the inner axial member via the main rubber elastic body, no undercut in an axial direction is set at each axial end of the main rubber elastic body against an axial opening of the outer cylindrical member, while by increasing the inclination angle of each second inclined cylindrical part through the drawing operation thereafter, an undercut in the axial direction is set at the axial end of the main rubber elastic body against the axial opening of the outer cylindrical member.

According to the manufacturing method of the present aspect, the degree of freedom can be increased in designing the configuration of the main rubber elastic body in the vibration damping bushing as a product by means of setting an undercut in the main rubber elastic body through the drawing operation of the outer cylindrical member after the molding thereof, while making the molding process easier using a structure with no undercut during the molding of the main rubber elastic body. For example, by setting an undercut in the main rubber elastic body through the drawing operation of the outer cylindrical member after the molding of the main rubber elastic body, it is made easily possible to further enhance the durability of the bushing by increasing the area of free surface of the end face of the main rubber elastic body where stress and strain are likely to be generated during the elastic deformation.

An eighth aspect of the present invention provides the manufacturing method of the vibration damping bushing according to any one of the first to seventh aspects, wherein a protrusion is provided to an outer peripheral face of the inner axial member at a location separated peripherally inward from an axial middle portion of the outer cylindrical member, and an inner peripheral face of an axial middle portion of the main rubber elastic body is fixed to the protrusion.

According to the manufacturing method of the present aspect, it becomes possible to set the thickness of the middle section of the main rubber elastic body in the axial direction smaller than the thickness of each end thereof due to the protrusion of the inner axial member. As a result, it becomes possible to set the spring constant in the prizing direction larger than that in the axis-perpendicular direction, while it becomes also possible to ensure durability and an increase in the spring constant in the axis-perpendicular direction in a highly compatible manner. The configuration of the protrusion provided in the inner axial member is not specifically limited, but a bulging protrusion with a cross section in an arc or trapezoidal shape with a larger protrusion height at the center than each end, for example, is preferably adopted.

A ninth aspect of the present invention provides the manufacturing method of the vibration damping bushing according to any one of the first to eighth aspects, wherein a recess is provided to an outer peripheral face of the inner axial member at a location separated peripherally inward from a distal end of each second inclined cylindrical part, and an inner peripheral face of each axial end of the main rubber elastic body is fixed to the recess.

According to the manufacturing method of the present aspect, the rubber volume at each axial end of the main rubber elastic body, where the strain grows during relative displacement between the inner axial member and the outer cylindrical member in the prizing direction, can be favorably secured by virtue of the recess in the inner axial member. As a result, further enhancement in durability of the main rubber elastic body can be achieved.

A tenth aspect of the present invention provides the manufacturing method of the vibration damping bushing according to any one of the first to ninth aspects, wherein the inner axial member, the outer cylindrical member, and the main rubber elastic body are fanned in rotational symmetry about a central axis.

According to the manufacturing method of the present aspect, it is not only that the manufacturing process is made easier by simplification of the configurations of the inner axial member, outer cylindrical member and the main rubber elastic body, but also further enhancement of durability becomes feasible by dispersing, in the circumferential direction, the stress and strain generated in the main rubber elastic body at the time of load input so as to alleviate or avoid localized concentration of the stress and strain.

An eleventh aspect of the present invention provides a vibration damping bushing comprising: an inner axial member; an outer cylindrical member arranged on an outer peripheral side of the inner axial member; a main rubber elastic body connecting the inner axial member and the outer cylindrical member in a radial direction; a pair of first inclined cylindrical parts provided on both axial sides of the outer cylindrical member and each having a diameter gradually reduced toward an axial outside; and a pair of second inclined cylindrical parts each provided so as to extend further toward the axial outside from an axial end of the corresponding first inclined cylindrical part with an inclination angle smaller than that of the first inclined cylindrical part, wherein pre-compression is applied to the main rubber elastic body through diameter reduction of the outer cylindrical member, lightening holes are provided so as to open onto both axial end faces of the main rubber elastic body, and an undercut in an axial direction is set in the main rubber elastic body against an axial distal end opening of each second inclined cylindrical part.

In the vibration damping bushing according to the present aspect, the first and second inclined cylindrical parts exert a restrictive effect against the swelling deformation of the main rubber elastic body outward in the axial direction at the time of load input in the axis-perpendicular direction, while by means of increasing the shear component as opposed to the compression component of elastic deformation of the main rubber elastic body at the time of load input in the prizing direction, it becomes feasible to achieve hard spring characteristics in the axis-perpendicular direction and soft spring characteristics in the prizing direction in a compatible manner.

Especially, due to the smaller inclination angle of the second inclined cylindrical part positioned outward from the first inclined cylindrical part in the axial direction so as to set two slope angles, generation of excessive stress and strain at each axial end of the main rubber elastic body can be avoided, thus enabling to obtain good durability at the same time.

In addition, since the main rubber elastic body is provided with the undercuts in the axial direction relative to the outer cylindrical member, the free surface of the axial end face of the main rubber elastic body can be set large enough even if the opening diameter of the outer cylindrical member in the axial direction is made small due to the inclinations of the first and second inclined cylindrical parts, so that it becomes more effectively feasible to achieve hard spring characteristics in the axis-perpendicular direction and soft spring characteristics in the prizing direction as described above that are exerted based on the inclination settings of the first and second inclined cylindrical parts as well as enhancement of durability of the main rubber elastic body.

According to the present invention, by means of restricting deformation of the main rubber elastic body by the first inclined cylindrical part that had been made inclined before the molding of the main rubber elastic body, improved settings of high-spring characteristics in the axis-perpendicular direction and low-spring characteristics in the prizing direction are provided. Thereafter, the second inclined cylindrical part is subjected to the drawing operation after the molding of the main rubber elastic body. By so doing, it becomes feasible to obtain the vibration damping bushing that achieves target high-spring characteristics in the axis-perpendicular direction and low-spring characteristics in the prizing direction in a compatible manner while limiting an amount of diameter reduction of the second inclined cylindrical part and minimizing deterioration of durability caused by strain and stress of the main rubber elastic body in association with the diameter-reducing process.

Also, in the vibration damping bushing with the structure according to the present invention, it becomes possible to highly achieve the high-spring characteristics in the axis-perpendicular direction and the low-spring characteristics in the prizing direction by the first and second inclined cylindrical parts with two inclination angle settings provided at the axial end of the outer cylindrical member as well as the main rubber elastic body structured with the undercuts, while maintaining high durability by avoiding generation of excessive stress and strain at the axial end of the main rubber elastic body.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
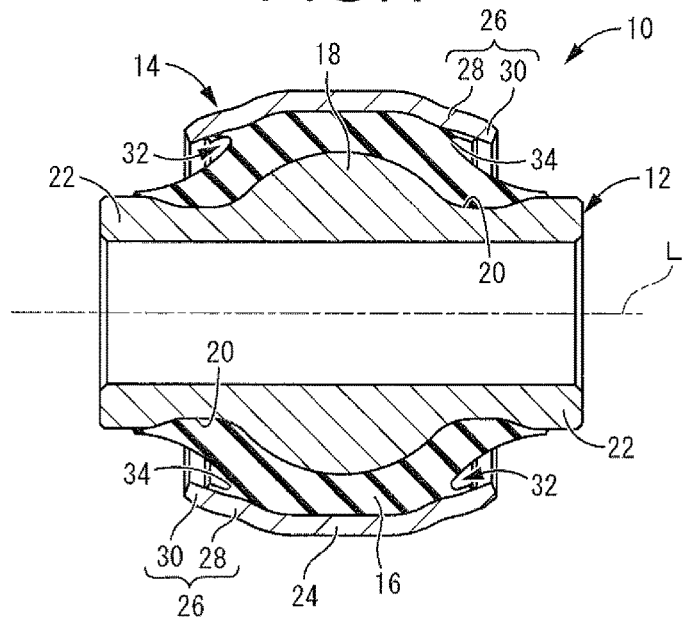
FIG. 1 is a cross sectional view showing a first embodiment of a vibration damping bushing manufactured according to the present invention, taken along line 1-1 of FIG. 2.
Figure 2:
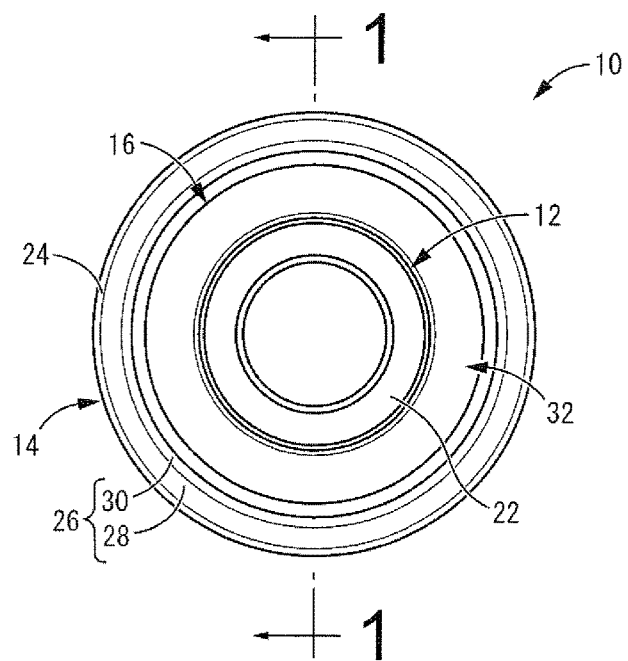
FIG. 2 is a left side view of FIG. 1.

First, FIGS. 1 and 2 show a vibration damping bushing 10 used for automobile suspension mechanism and the like as a first embodiment of the vibration damping bushing manufactured according to the method of the present invention. The vibration damping bushing 10 has a structure where an inner cylindrical metal fitting 12 serving as an inner axial member and an outer cylindrical metal fitting 14 serving as an outer cylindrical member arranged spaced apart on the outer peripheral side of the inner cylindrical metal fitting 12 are connected by a main rubber elastic body 16 in the radial direction.

More specifically, the inner cylindrical metal fitting 12 is made in an approximate shape of a thick circular cylinder extending along a straight centerline. The inner cylindrical metal fitting 12 has its center portion in the axial direction made larger in diameter than the rest, and a protrusion 18 is formed on the outer peripheral face to protrude therefrom. Such protrusion 18 is formed continuously all around the circumference with a cross-section of a convex arc, and the outer peripheral face of the inner cylindrical metal fitting 12 is made in an approximate shape of a pillow ball with a bulging protrusion at the center in the axial direction.

Also, on each side of the protrusion 18 in the axial direction, a recess 20 is formed to open to the outer peripheral face of the inner cylindrical metal fitting 12. Such recess 20 is made with a structure of a peripheral groove that extends continuously all around the circumference with a near-constant cross-section. Both sides of each recess 20 in the width direction (left-right direction in FIG. 1) are smoothly connected to the protrusion 18 as well as the outer periphery of the axial end of the inner cylindrical metal fitting 12. Axial ends of the inner cylindrical metal fitting 12 positioned outside each recess 20 constitute cylindrical outer peripheral faces 22, 22 that extend in the axial direction with a constant outer diameter.

Meanwhile, the outer cylindrical metal fitting 14 is in an approximate shape of a circular cylinder extending along a straight centerline with a larger diameter and a thinner wall than those of the inner cylindrical metal fitting 12. The center portion of the outer cylindrical metal fitting 14 in the axial direction constitutes a central cylindrical portion 24 extending in the axial direction with a constant diameter. Also, a pair of tapered cylindrical portions 26, 26 are integrally formed at both axial sides of the central cylindrical portion 24 each extending in the axial direction in a tapered shape thinning toward the tips.

Figure 3:
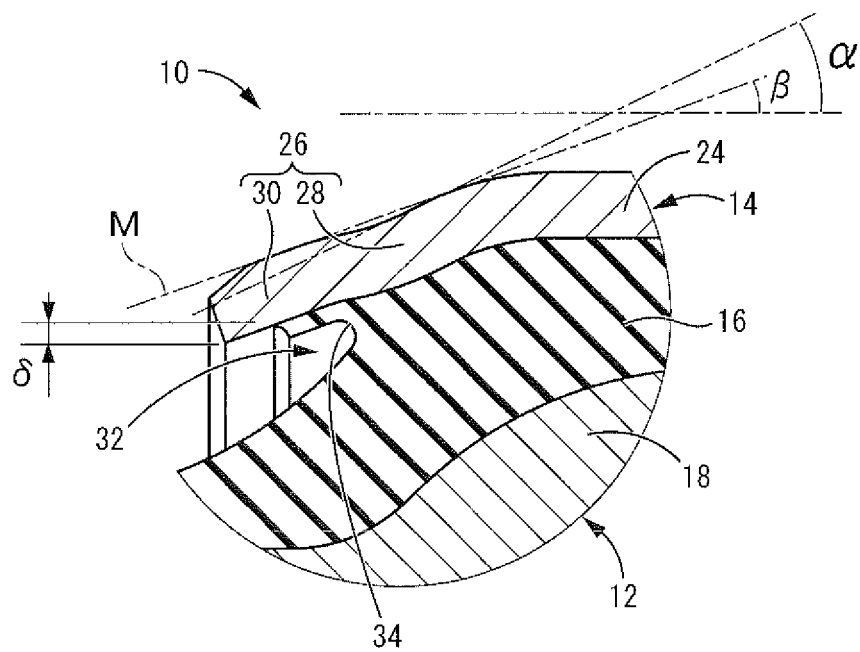
FIG. 3 is an enlarged view of a principal part of FIG. 1.

In addition, each tapered cylindrical portion 26, as shown in FIG. 3, comprises a first inclined cylindrical part 28 that extends outward from the axial end of the central cylindrical portion 24 and a second inclined cylindrical part 30 that extends further outward from the axial end of the first inclined cylindrical part 28. Also, the inclination angle β of the second inclined cylindrical part 30 is made smaller than the inclination angle α of the first inclined cylindrical part 28. The inclination angles α, β are measured against the central axis of the outer cylindrical metal fitting 14. This makes the tapered cylindrical portion 26 in a two-step tapered cylinder with the inclination angle changed in the middle portion thereof in the axial direction.

Then, the outer cylindrical metal fitting 14 is externally fitted to the inner cylindrical metal fitting 12 to be arranged to cover the outer periphery of the axial middle portion thereof, and the both cylindrical metal fittings 12, 14 are arranged on the same central axis L spaced apart from each other in the radial direction. The outer cylindrical metal fitting 14 is made shorter in the axial direction than the inner cylindrical metal fitting 12 so that the axial ends of the inner cylindrical metal fitting 12 protrude out from each axial end of the outer cylindrical metal fitting 14.

Also, the central cylindrical portion 24 of the outer cylindrical metal fitting 14 is arranged so as to separately cover the outer periphery of the axial middle portion of the protrusion 18 of the inner cylindrical metal fitting 12. In addition, each tapered cylindrical portion 26 is arranged so as to cover the outer periphery of the area from the end of the protrusion 18 to the recess 20. Furthermore, the axial end of each tapered cylindrical portion 26, that is, each of the second inclined cylindrical parts 30 is positioned away from the recess 20 toward the outer periphery. In other words, the length of the central cylindrical portion 24 of the outer cylindrical metal fitting 14 in the axial direction is made smaller than the length of the protrusion 18 of the inner cylindrical metal fitting 12 in the same direction. Also, the entire length of the outer cylindrical metal fitting 14 in the axial direction is made longer than that of the protrusion 18 of the inner cylindrical metal fitting 12 in the same direction but shorter than the distance between the outmost ends of the recesses 20, 20 in the axial direction.

Between the opposing faces in the radial direction of the inner cylindrical metal fitting 12 and the outer cylindrical metal fitting 14 fitted externally to the inner cylindrical metal fitting 12 and arranged on the same central axis L as described above, the main rubber elastic body 16 is disposed. The main rubber elastic body 16 is in an approximate shape of a thick circular cylinder as a whole, and the outer peripheral face of the inner cylindrical metal fitting 12 is fixed to the inner peripheral face of the main rubber elastic body 16, while the inner peripheral face of the outer cylindrical metal fitting 14 is fixed to the outer peripheral face of the main rubber elastic body 16.

The fixing face of the main rubber elastic body 16 against the inner cylindrical metal fitting 12 extends outward beyond both ends of the outer cylindrical metal fitting 14 in the axial direction in the length reaching the cylindrical outer peripheral face 22 of the inner cylindrical metal fitting 12. Then, the axial middle portion of the main rubber elastic body 16 is fixed to the protrusion 18 of the inner cylindrical metal fitting 12, while both axial ends of the main rubber elastic body 16 are fixed to the respective recesses 20, 20 of the inner cylindrical metal fitting 12 so as to fill up the entire space therein. Meanwhile, the fixing face of the main rubber elastic body 16 against the outer cylindrical metal fitting 14 runs all across the central cylindrical portion 24 through the first inclined cylindrical part 28 all the way to the inner face of the second inclined cylindrical part 30, extending past the axial middle portion and almost reaching the tip thereof.

In addition, at both axial ends of the main rubber elastic body 16, a pair of lightening holes 32, 32 are formed to open toward the axial outside at the axial end faces. Each of such lightening holes 32 is made in an approximate sideway U-shape in cross-section to become a hollowed groove that extends all around the circumference with a constant cross-section.

Also, an axial bottom face 34, which is the deepest portion of the lightening hole 32 in the axial direction, is positioned on the inner peripheral side of the tapered cylindrical portion 26, and particularly in the present embodiment, on the inner peripheral side of the second inclined cylindrical part 30.

Furthermore, an undercut configuration in the axial direction is provided at each axial end of the main rubber elastic body 16, where the lightening hole 32 is formed, against the axial distal end opening of the corresponding second inclined cylindrical part 30. That is, as shown in FIG. 3, the fixed edge of the main rubber elastic body 16 against the outer cylindrical metal fitting 14 and the axial bottom face 34 of the lightening hole 32 are configured, in the axial direction which is the demolding direction of the vulcanization molded product of the main rubber elastic body 16, with an undercut having an overlap $\delta$ in the radial direction relative to the inner peripheral edge of the axial opening of the second inclined cylindrical part 30.

Manufacturing of the vibration damping bushing 10 of the present embodiment with the structure described above can be implemented, for example, by the following process:

First, the inner cylindrical metal fitting 12 in a specific shape having the protrusion 18 and the pair of recesses 20, 20 on the outer peripheral face, and the outer cylindrical metal fitting 14 in a specific shape having the tapered cylindrical portions 26, 26 on both sides of the central cylindrical portion 24 in the axial direction, as described above, are each prepared.

Next, pretreatment for vulcanization bonding such as chemical conversion coating is applied as necessary to the inner cylindrical metal fitting 12 and the outer cylindrical metal fitting 14, which are then be positioned and set in the molding cavity of the metal mold for the main rubber elastic body 16. Then, after filling a specified material in the closed molding cavity, the main rubber elastic body 16 is vulcanization-molded by a vulcanization process including heating, and then the main rubber elastic body 16 is bonded by vulcanization to the inner cylindrical metal fitting 12 and the outer cylindrical metal fitting 14.

Figure 4:
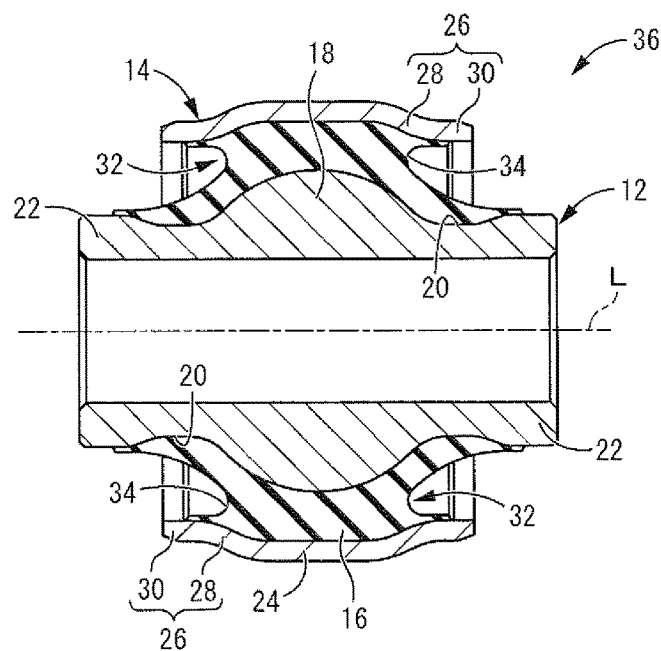
FIG. 4 is a longitudinal cross sectional view of an integrally vulcanization molded component before the drawing operation of the vibration damping bushing shown in FIG. 1, taken along line 4-4 of FIG. 5.
Figure 5:
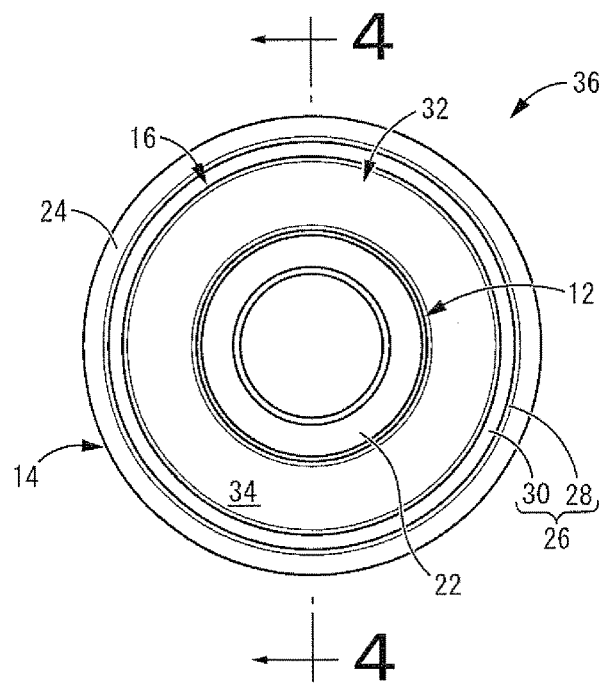
FIG. 5 is a left side view of FIG. 4.
Figure 6:
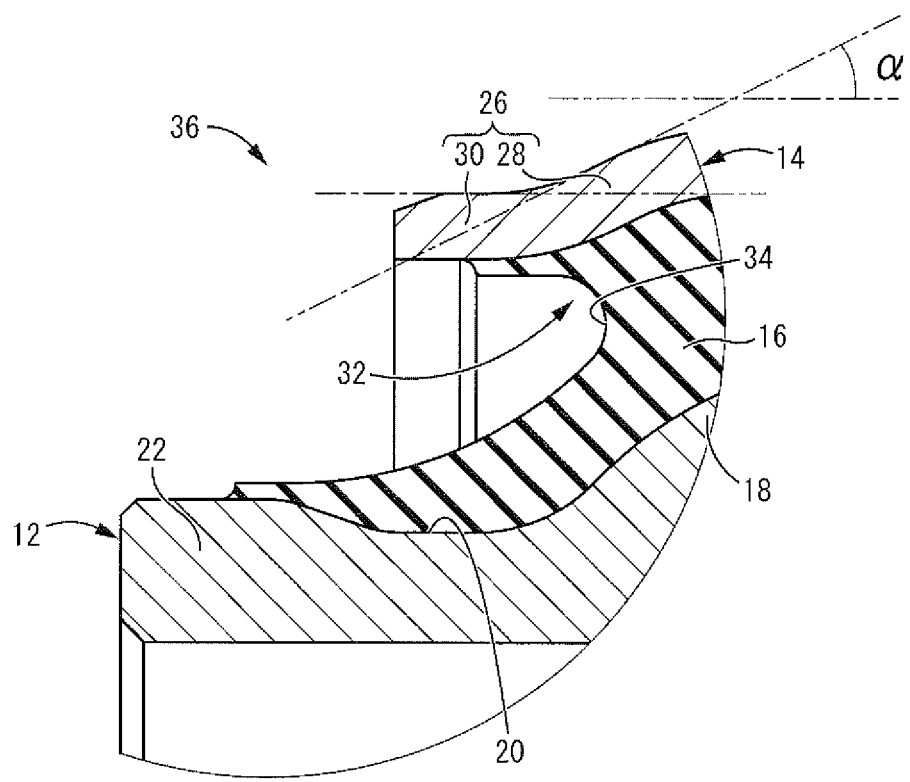
FIG. 6 is an enlarged view of a principal part of FIG. 4.

FIGS. 4 to 6 show an integrally vulcanization molded component 36 of the main rubber elastic body 16 obtained by the method described above.

As shown in FIGS. 4 to 6, the outer cylindrical metal fitting 14 of the integrally vulcanization molded component 36 is made one-size larger in diameter as a whole than the vibration damping bushing 10, the final product. Also, the first inclined cylindrical part 28 of the integrally vulcanization molded component 36 is made inclined by the angle almost equivalent to the inclination angle $\alpha$ of the final product vibration damping bushing 10, but the second inclined cylindrical part 30 is made inclined by the angle smaller than that of the final product vibration damping bushing 10.

In the present embodiment, the inclination angle of the second inclined cylindrical part 30 in the outer cylindrical metal fitting 14 of the integrally vulcanization molded component 36 is made near-zero degree, which extends in the axial direction from each axial end of the first inclined cylindrical part 28 in a cylindrical shape.

Also the pair of lightening holes 32, 32 provided at the axial ends of the main rubber elastic body 16 of the integrally vulcanization molded component 36 are each formed with a larger interior space than that of the final product vibration damping bushing 10, both in the radial and axial directions.

Especially in the present embodiment, the axial bottom face 34, which is the deepest portion of each lightening hole 32 in the axial direction, is positioned on the inner peripheral side of the corresponding first inclined cylindrical part 28 in the integrally vulcanization molded component 36. Also, the axial end of the main rubber elastic body 16 where each lightening hole 32 is formed is exposed from the opening of the second inclined cylindrical part 30 in the axial direction without having an undercut configuration in the axial direction.

The integrally vulcanization molded component 36 obtained by the process described above is then treated with a drawing operation of the second inclined cylindrical parts 30, 30 of the outer cylindrical metal fitting 14. Specifically, this treatment is applied by means of using a drawing operation mold with eight- or sixteen-divided piece of mold for example, and press-deforming such mold-surface by pressing it against the outer peripheral face of the outer cylindrical metal fitting 14 in the direction of getting closer to the central axis.

Because of this drawing operation, the central cylindrical portion 24 and the first inclined cylindrical part 28 of the outer cylindrical metal fitting 14 are processed for diameter reduction so as to achieve the diameter of the vibration damping bushing 10 as a final product while substantially maintaining their cross-sectional shapes. This allows the main rubber elastic body 16 to be pre-compressed in the present embodiment. Meanwhile, the second inclined cylindrical part 30 is processed with diameter-reduction deformation so as to achieve the desired diameter of the vibration damping bushing 10 as a final product as well as the inclination angle $\beta$ by means of increasing the inclination angle while reducing the diameter thereof.

In such a drawing operation, it is possible to work on the molding by having the entire outer peripheral face of the outer cylindrical metal fitting 14 in close contact with the mold-surface using a metal mold having a mold-surface processed in high precision to conform to the outer peripheral configuration of the target outer cylindrical metal fitting 14, but it is also possible to apply a drawing operation using a metal mold having a mold-surface that gives a straight line (line M in FIG. 3) that runs from both axial ends of the central cylindrical portion 24 to the target tip of the second inclined cylindrical part 30.

Using the metal mold that gives the line M as described above, there is a risk of generating a gap between the first inclined cylindrical part 28 and the mold-surface, but due to the fact that larger drawing operation forces are applied to the second inclined cylindrical part 30 located toward the tip, it becomes possible to continue processing until the inclination angle of the second inclined cylindrical part 30 reaches the approximate target angle while approximately maintaining the inclination angle of the first inclined cylindrical part 28.

In addition, during the drawing operation described above, the second inclined cylindrical part 30 undergoes a diameter-reducing process to shorten the face-to-face distance from the inner cylindrical metal fitting 12 in the radial direction. Besides, the main rubber elastic body 16 is subject to swelling deformation to both axial sides in association with compressive deformation exerted thereon in the radial direction. This allows the lightening holes 32, 32 formed at both axial ends of the main rubber elastic body 16 to have smaller interior space both in the radial and axial directions to produce the configuration of the final product as shown in FIG. 3.

Especially in the present embodiment, the axial bottom face 34 of the lightening hole 32 positioned on the inner peripheral side of the first inclined cylindrical part 28 before the drawing operation is forced to move to the position on the inner peripheral side of the corresponding second inclined cylindrical part 30 after the drawing operation.

Also, by increasing the inclination angle of the second inclined cylindrical part 30 by the drawing operation, an undercut configuration in the axial direction is given to the axial end of the main rubber elastic body 16 including the fixed portion to the outer cylindrical metal fitting 14 as well as the axial bottom face 34 of the lightening hole 32 against the axial opening of the outer cylindrical metal fitting 14.

The vibration damping bushing 10 of the present embodiment manufactured through the process described above is mounted to the vehicle mounting portion of the suspension arm by means of, for example, having the mounting bolt that is fixed to the vehicular body inserted into the inner cylindrical metal fitting 12 to mount it to the vehicular body, while having the outer cylindrical metal fitting 14 press-fitted to the arm eye provided at the edge of the suspension arm composing the suspension mechanism so as to mount the outer cylindrical metal fitting 14 to the suspension arm.

Then, under such mounted condition where the direction of the central axis of the vibration damping bushing 10 nearly coincides with the front-rear direction and the axis-perpendicular direction nearly coincides with the left-right direction of the vehicle, the suspension arm is connected to the vehicular body in a vibration damping manner. Since the vibration damping bushing 10 of the present embodiment as a whole including the inner cylindrical metal fitting 12, the outer cylindrical metal fitting 14, and the main rubber elastic body 16 is formed in rotational symmetry about the central axis L, positioning in the circumferential direction is no longer required in the process of mounting it to a vehicle, thus enabling to obtain stable vibration damping performance.

Under such a mounted condition, the vibration damping bushing 10 is required to have high-spring characteristics in the axis-perpendicular direction for the purpose of securing the driving stability of motor vehicles, while low (soft) spring characteristics in the axial direction are required in order to achieve good riding comfort.

Now, in the vibration damping bushing 10 with the structure described above, since a higher spring constant in the axis-perpendicular direction is achieved based on the control effect of the main rubber elastic body 16 against its swelling deformation in the axial direction due to the first inclined cylindrical part 28 that had been made inclined prior to the vulcanization molding of the main rubber elastic body 16, while a relatively low spring constant can be obtained in the prizing direction, it becomes possible to effectively obtain high-spring characteristics in the axis-perpendicular direction and low-spring characteristics in the prizing direction as required for the vibration damping bushing 10 without excessively increasing the increment of the inclination angle of the second inclined cylindrical part 30 after the vulcanization molding of the main rubber elastic body 16.

Therefore, it becomes possible to obtain high durability of the bushing while preventing any cracks by limiting the increment of the inclination angle of the second inclined cylindrical part 30 in the drawing operation thereof after the vulcanization molding of the main rubber elastic body 16 so as to mitigate generation of strain and stress at both axial ends of the main rubber elastic body 16 while securing high-spring characteristics in the axis-perpendicular direction and low-spring characteristics in the prizing direction required for the vibration damping bushing 10.

Also, in the vibration damping bushing 10 described above, easy molding is made possible avoiding generation of any undercut at the lightening holes 32, 32 of the main rubber elastic body 16 at its both axial end faces at the time of vulcanization molding thereof so as to be able to form the lightening holes 32, 32 in an undercut shape through the drawing operation of the outer cylindrical metal fitting 14 after the vulcanization molding thereof. Therefore, it becomes possible to set the free surface large enough at the axial end faces of the main rubber elastic body 16 while avoiding any increase in the number of manufacturing processes and manufacturing cost, thus enabling to further enhance the durability of the main rubber elastic body 16 and even the vibration damping bushing 10.

In the vibration damping bushing 10 of the present embodiment, there is a risk that the distance between the opposing faces of the inner cylindrical metal fitting 12 and the outer cylindrical metal fitting 14 in the radial direction, and even thickness of the main rubber elastic body 16 interposed between them get smaller at axial ends. However, since the thickness dimension of the main rubber elastic body 16 in the axial direction is secured due to those recesses 20, 20 on the inner cylindrical metal fitting 12, the problems of drastic changes in spring characteristics of the second inclined cylindrical part 30 caused by the diameter-reduction process applied to it and reduced durability thereof can be alleviated or avoided effectively.

Embodiments of the present invention have been descried in detail above, but the present invention is not limited by those specific descriptions. For example, the manufacturing method of the present invention can even be applied to cases where the protrusion 18 or the recess 20 is not formed in the inner cylindrical metal fitting 12, or the lightening holes are not formed in the main rubber elastic body 16, and the manufacturing method of the present invention does not require such configurations.

Also, in one of the embodiments described above, a drawing operation with eight- or sixteen-divided piece of mold was exemplified as a drawing operation applied to the outer cylindrical metal fitting 14, but it is not limited to those but conventionally known drawing operations such as spinning are also adoptable.

Furthermore, the length of the first inclined cylindrical part 28 or the second inclined cylindrical part 30 in the axial direction in the outer cylindrical metal fitting 14 is not particularly limited but can be set as appropriate in accordance with the required vibration damping characteristics and the size of the vibration damping bushing and the like.

Moreover, the vibration damping bushing relating to the present invention is not limited to a suspension bushing for motor vehicles but can be used as a torque rod bushing or the like.

What is claimed is:

1. A manufacturing method of a vibration damping bushing wherein an outer cylindrical member is arranged on an outer peripheral side of an inner axial member, and the inner axial member and the outer cylindrical member are connected in a radial direction by a main rubber elastic body, the method comprising:
provide the outer cylindrical member on its both axial sides with a pair of first inclined cylindrical parts each having a diameter gradually reduced toward an axial outside and a pair of second inclined cylindrical parts each extending further toward the axial outside from an axial end of the corresponding first inclined cylindrical part with an inclination angle smaller than that of the first inclined cylindrical part;
arranging the outer cylindrical member on the outer peripheral side of the inner axial member and connecting the outer cylindrical member and the inner axial member via the main rubber elastic body; and then
deforming axial ends of the main rubber elastic body by deforming the second inclined cylindrical parts of the outer cylindrical member through a drawing operation so that a difference between the inclination angles of the first inclined cylindrical parts and the second inclined cylindrical parts made smaller,
wherein the drawing operation includes increasing the inclination angle of the second inclined cylindrical parts while maintaining the inclination angle of the first inclined cylindrical parts.

2. The manufacturing method of the vibration damping bushing according to claim 1, wherein the drawing operation includes setting the inclination angle of the second inclined cylindrical parts after the drawing operation at not more than that of the first inclined cylindrical parts after the drawing operation.

3. The manufacturing method of the vibration damping bushing according to claim 1, wherein lightening holes are provided so as to open onto both axial end faces of the main rubber elastic body, and an axial bottom face of each lightening hole is located on an inner peripheral side of the corresponding first inclined cylindrical part before the drawing operation of the outer cylindrical member.

4. The manufacturing method of the vibration damping bushing according to claim 1, wherein lightening holes are provided so as to open onto both axial end faces of the main rubber elastic body, and an axial bottom face of each lightening hole is located on an inner peripheral side of the corresponding second inclined cylindrical part by means of compressive deformation exerted on the main rubber elastic body in an axis-perpendicular direction through the drawing operation to cause swelling deformation to both axial sides thereof.

5. The manufacturing method of the vibration damping bushing according to claim 1, wherein pre-compression is applied to the main rubber elastic body through a drawing operation of an axial center portion and the first inclined cylindrical parts of the outer cylindrical member to reduce their diameters as well.

6. The manufacturing method of the vibration damping bushing according to claim 1, wherein during arranging the outer cylindrical member on the outer peripheral side of the inner axial member and connecting the outer cylindrical member and the inner axial member via the main rubber elastic body, no undercut in an axial direction is set at each axial end of the main rubber elastic body against an axial opening of the outer cylindrical member, while by increasing the inclination angle of each second inclined cylindrical part through the drawing operation thereafter, an undercut in the axial direction is set at the axial end of the main rubber elastic body against the axial opening of the outer cylindrical member on an inner peripheral side of the outer cylindrical member.

7. The manufacturing method of the vibration damping bushing according to claim 1, wherein a protrusion is provided to an outer peripheral face of the inner axial member at a location separated peripherally inward from an axial middle portion of the outer cylindrical member, and an inner peripheral face of an axial middle portion of the main rubber elastic body is fixed to the protrusion.

8. The manufacturing method of the vibration damping bushing according to claim 1, wherein a recess is provided to an outer peripheral face of the inner axial member at a location separated peripherally inward from a distal end of each second inclined cylindrical part so that the second cylindrical part and the recess are arranged at positions corresponding to each other in the axial direction, and an inner peripheral face of each axial end of the main rubber elastic body is fixed to the recess.

9. The manufacturing method of the vibration damping bushing according to claim 1, wherein the inner axial member, the outer cylindrical member, and the main rubber elastic body are formed in rotational symmetry about a central axis.

10. The manufacturing method of the vibration damping bushing according to claim 4, wherein before the drawing operation against the second inclined cylindrical parts, the axial bottom face of the each lightening hole is positioned on an inner peripheral side of the first inclined cylindrical part, and after the drawing operation against the second inclined cylindrical parts, the axial bottom face of the each lightening hole is moved to a position on the inner peripheral side of the corresponding second inclined cylindrical part.

* * * * *